(No Model.)  2 Sheets—Sheet 1.
L. B. GRAY & J. HAM.
PRESS FOR MOLDING GLASS INSULATORS.
No. 306,147.  Patented Oct. 7, 1884.
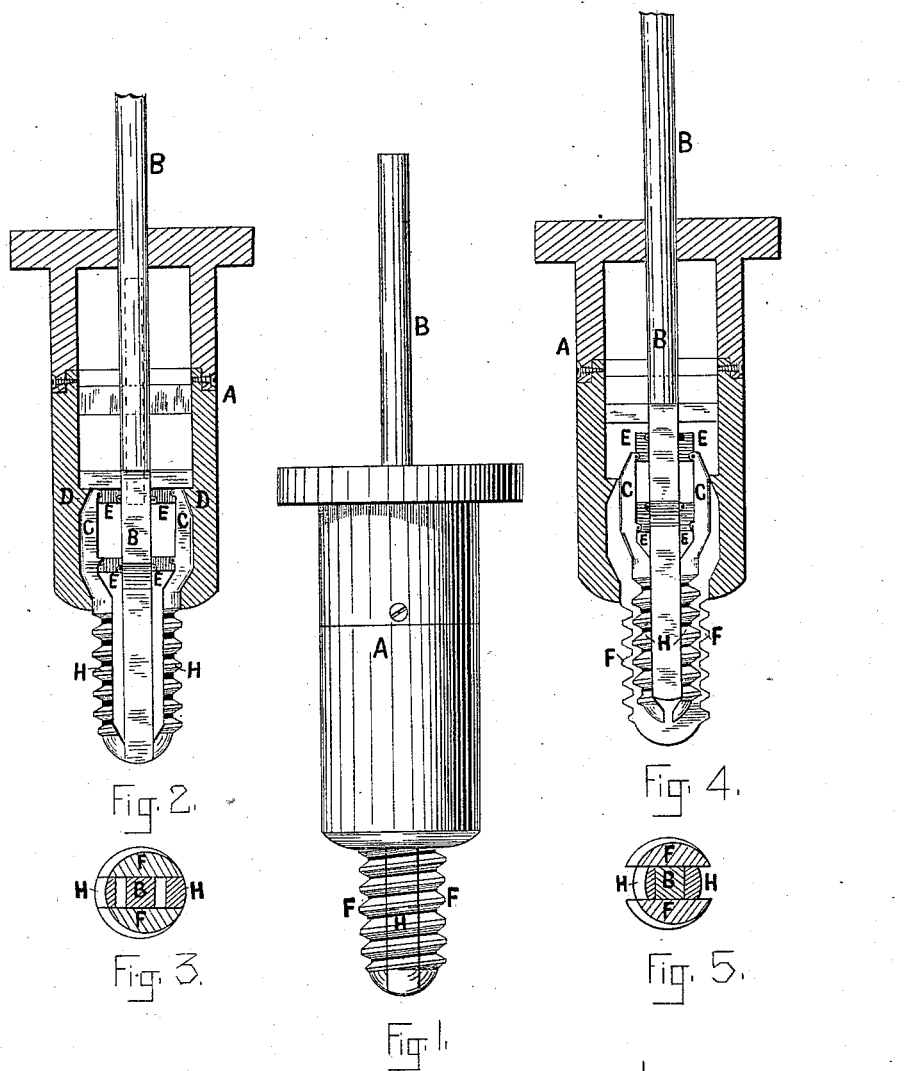
Witnesses:
C. S. Gooding.
W. R. Marble
Inventors:
Lawrence B. Gray
Joseph Ham,
By Sylvenus Walker
Attorney (No Model.) 2 Sheets—Sheet 2.

L. B. GRAY & J. HAM.
PRESS FOR MOLDING GLASS INSULATORS.

No. 306,147. Patented Oct. 7, 1884.

WITNESSES:
C. S. Gooding
W. R. Marble

INVENTORS:
Lawrence B. Gray
Joseph Ham
By Sylvenus J. Walker
Attorney

UNITED STATES PATENT OFFICE.

LAWRENCE B. GRAY AND JOSEPH HAM, OF BOSTON, MASSACHUSETTS.

PRESS FOR MOLDING GLASS INSULATORS.

SPECIFICATION forming part of Letters Patent No. 306,147, dated October 7, 1884.

Application filed April 28, 1884. (No model.)

*To all whom it may concern:*

Be it known that we, LAWRENCE B. GRAY and JOSEPH HAM, of Boston, in the county of Suffolk and State of Massachusetts, have invented certain new and useful Improvements in Presses for Molding Glass Insulators, of which the following is a specification.

The object of our invention is to provide a cheap, simple, convenient, and efficient press for molding glass insulators and forming within the opening of the insulator an internal screw-thread, and permit the screw-threaded plunger forming the same to be removed therefrom by a single upward movement without disturbing the screw-thread thus formed; and it consists in the construction, combination, and arrangement of a contractible screw-threaded plunger adapted to form a continuous screw-thread within the insulator, as hereinafter more fully described, and set forth in the claim.

Figure 6:
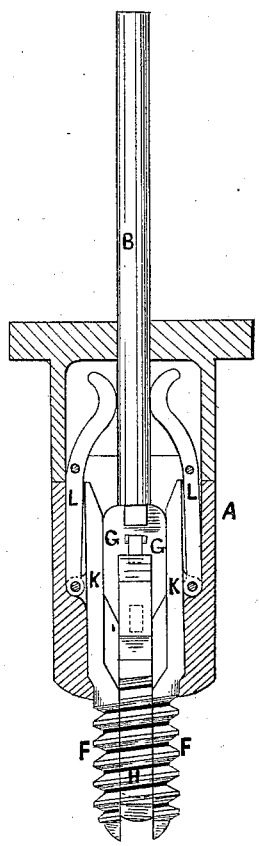
Figure 7:
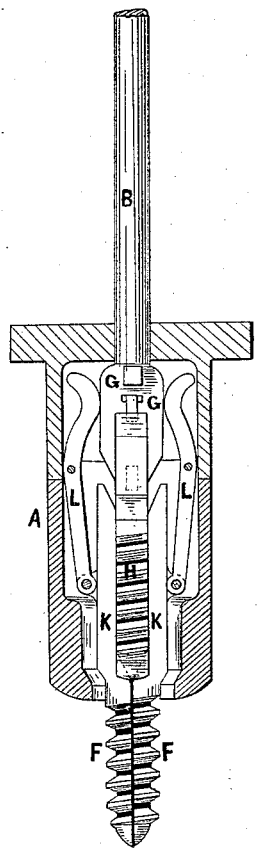
Figure 8:

Figure 1 represents a side elevation of a plunger constructed according to our invention. Fig. 2 represents a vertical sectional elevation of the same. Fig. 3 represents a horizontal cross-section of the screw-threaded portion. Fig. 4 represents a vertical sectional elevation, showing a portion of the screw-thread contracted. Fig. 5 represents a horizontal cross-section of the same. Fig. 6 represents a vertical sectional elevation taken at a right angle to the view shown in Fig. 4. Fig. 7 represents a similar view, showing opposite portions of the screw-thread contracted. Fig. 8 represents a horizontal cross-section of the same.

A represents a cylindric shell or case having a small opening through the upper end, within which is fitted to slide freely the plunger-rod B, to the inclosed portion of which are hinged or pivoted the upper end portions of the adjustable actuating-bars C by means of the short hinge-pieces E, which are adapted to turn or fold from a horizontal to a vertical position. As the said plunger-rod B is drawn upward, the incline-outward face portions contact with the incline-faced lugs D, formed upon the case A, as shown in Figs. 2 and 4, the said bars C being provided at their lower end portions with a screw-thread, H, which is thus withdrawn inwardly or centrally, so as to clear the screw-thread formed thereby in the interior of the insulator, as shown in Figs. 4 and 5, and when thus contracted a further upward movement of the said plunger-rod B actuates the pivoted levers L, the lower ends of which are pivoted to the bars K within the said case A, and the inward curved upper ends of which contact with the projections G, formed upon opposite sides of the said plunger-rod B, and thereby force inwardly or centrally the lower end portions of the said bars K, the outward faces of which are provided with a screw-thread, F, and thus remove the said screw-thread portions F from the screw-thread formed thereby within an insulator, the said screw-thread portions F being contracted into the position shown in Figs. 7 and 8. The downward or reverse movement of the said plunger-rod B returns the sectional screw-thread portions F and H into their expanded positions, (shown in Fig. 1.) It will be seen and understood that by means of the above-described plunger a glass insulator may be pressed into a suitable mold, so as to form a continuous screw-thread within the same, and permit the screw-threaded plunger to be contracted and then removed therefrom by a single upward movement without disturbing the said screw-thread.

Having thus described our invention, what we claim is—

The combination, with the shell or case A, of the sliding plunger B, having the actuating-bars C connected thereto by the hinge-pieces E, and provided with a screw-thread, H, and the levers L, pivoted to the case and pivoted to the bars K, and provided with a screw-thread, F, substantially as described.

LAWRENCE B. GRAY.
JOSEPH HAM.

Witnesses:
SYLVENUS WALKER,
CHAS. S. GOODING.